(12) United States Patent
Motsenbocker

(10) Patent No.: US 8,906,840 B2
(45) Date of Patent: Dec. 9, 2014

(54) LOW VOC COMPOSITION TO REMOVE GRAFFITI

(76) Inventor: Gregg Motsenbocker, San Diego, CA (US)

( * ) Notice: Subject to any disclaimer, the term of this patent is extended or adjusted under 35 U.S.C. 154(b) by 241 days.

(21) Appl. No.: 13/614,769

(22) Filed: Sep. 13, 2012

(65) Prior Publication Data

US 2014/0073544 A1  Mar. 13, 2014

(51) Int. Cl.
| | | |
|---|---|---|
| *C11D 3/43* | (2006.01) | |
| *C09D 9/00* | (2006.01) | |
| *C11D 7/26* | (2006.01) | |
| *C11D 3/20* | (2006.01) | |

(52) U.S. Cl.
CPC ............... *C09D 9/005* (2013.01); *C11D 7/264* (2013.01); *C11D 7/263* (2013.01); *C11D 3/43* (2013.01); *C11D 3/2093* (2013.01)
USPC ............ 510/365; 510/417; 510/505; 510/506

(58) Field of Classification Search
CPC ........ C11D 3/43; C11D 3/2093; C11D 7/263; C11D 7/264
USPC .................................. 510/365, 417, 505, 506
See application file for complete search history.

(56) References Cited

U.S. PATENT DOCUMENTS

| | | | | |
|---|---|---|---|---|
| 5,227,085 | A | * | 7/1993 | Motsenbocker ............... 510/372 |
| 5,817,585 | A | * | 10/1998 | Rose et al. ..................... 442/417 |
| 6,191,087 | B1 | * | 2/2001 | Opre et al. ..................... 510/201 |
| 6,984,269 | B2 | * | 1/2006 | Motson ............................ 134/38 |
| 7,053,037 | B2 | * | 5/2006 | Smith et al. ................... 510/417 |
| 2006/0234890 | A1 | * | 10/2006 | Griese et al. .................. 510/214 |
| 2011/0312870 | A1 | * | 12/2011 | Beatty ............................ 510/417 |
| 2012/0128614 | A1 | * | 5/2012 | Rieth et al. ................... 424/70.1 |

* cited by examiner

*Primary Examiner* — Gregory Webb
(74) *Attorney, Agent, or Firm* — Steven W. Webb

(57) ABSTRACT

A Low-VOC, water-based graffiti cleaner containing water, Glycol Ether EB, Acetone, DBE, Acetic acid, and a small amount of fragrance. The VOC content of this composition is less than or equal to 15.5%.

8 Claims, No Drawings

LOW VOC COMPOSITION TO REMOVE GRAFFITI

FIELD OF THE INVENTION

Compositions to remove paint and enamel, acrylic, primer, and sealant from surfaces such as carpets, cloth, leather and suede, hard surfaces such as street signs, tile and brick to restore them as closely as possible to a clean condition.

BACKGROUND OF THE INVENTION

Porous surfaces, such as those of carpets, clothing, automobile seats, and certain metal and metal composites, and other hard surfaces such as tile, vinyl, and plastics can be marked with paint or ink in the form of graffiti. Permanent marker inks, and printers inks, enamel and acrylics, and highlighters can be used. Note that this composition will not harm Lexan® or Plexiglass®.

The above recitation exemplifies a broad range of materials which need to be cleaned from a broad range of deposits and stains. In response to this need, an equally wide range of cleaning compositions already exists in the market.

Generally speaking, commercial compositions are limited both in the range of their effectiveness, and also as to how efficient they really are for their intended purpose. If one intends to remove a graffito, he is likely to find a nearly-equal number of formulations to buy for the purpose. In addition, some of the stains and deposits are usually only partially removed after application of market-available cleaners, and with risk to the material being cleaned. On the consumer market today, for example, there is no known composition which will remove marking pen dye from a white tablecloth. The present invention will.

Furthermore, many existing compositions are objectionable from an environmental standpoint. This composition is water-based, and is environmentally acceptable. The composition is available in a 3% Volatile Organic Compound (VOC) configuration and will perform surface cleaning.

It is an object of this invention to provide a water-based environmentally acceptable, biodegradable cleaning composition which can be used to remove graffiti. Any residue of these compositions which might remain on the surface, or in the fabric underlying it, will not adversely affect the user or the surface to which it was applied. It has proved to be a considerable surprise to observe how many types of really difficult stains and deposits these compositions can remove, with little or no remaining evidence that there ever had been a stain or a deposit, or that the composition ever had been applied, all without damage to the material being cleaned.

BRIEF DESCRIPTION OF THE INVENTION

A composition according to this invention specifically designed to attack and remove graffiti is water-based and comprises, in addition to water, Glycol Ether EB, Acetone, DBE, Acetic acid, and a small amount of fragrance. This composition is surprisingly effective for the removal of pen and grease pencil stains attached to flat surfaces.

This formulation represents a paradigm shift away from traditional cleaners. All cleaners in the market today clean specified substrates, e.g. tile cleaner, bathroom cleaner, floor cleaner, carpet cleaner, pre-wash; this formulation attacks specific stain types, for ANY substrate. Cleaners in today's market are basically just soap and water. This VOC-compliant formulation works better than non-VOC-formulations in the market, remaining safe for the environment, safe for the individual, and safe for any surface.

DETAILED DESCRIPTION OF THE INVENTION

The basic formulation of this invention, itself useful for cleaning cleaning graffiti from a wide range of substrate materials from deposits and stains is an aqueous solution of water, Glycol Ether EB, Acetone, DBE, Acetic acid, and a small amount of fragrance. This solution is biodegradable, low-VOC (3% VOC content) and is applicable to a wide range of materials without damaging them. It is best to wash it out after the solution has done its work—it does leave a small but usually unobjectionable deposit. The components of the solution are benign, and if left in place will cause no damage to the substrate (soiled) material to which the solution is applied, nc)r to persons who come in contact with it.

The combination of components used herein appears to function synergistically, by mechanisms which are not fully understood at this time. What has become apparent is that the total composition functions to a degree of effectiveness much greater than already-known compositions useful for the intended purposes, and that elimination of any of the components greatly reduces the effectiveness of the composition. U.S. Pat. No. 5,484,487 to Motsenbocker teaches the application process for the present invention.

As a preliminary observation, it should be noted that purified water (either distilled, de-ionized or softened), is preferred. If it is used, the solution will be clear. If water is used which is not purified, then the solution is likely to be cloudy and sometimes less acceptable to the user. However, some users might actually prefer a cloudy or milky composition. Use of tap water will usually result in this.

Some paints and deposits are more resistant to the basic formulation, usually because their dyes or other colorizers must be attended to either by decolorizing them, or by solubilizing them. Examples of these materials are fluid inks such as fountain pen inks, marker inks, and ball point inks. These are notoriously difficult to remove without damage to cloth, with the use of cleaning solutions generally available in a household, and with the skill and knowledge of the householder. Especially this is the situation where water-based formulations are needed. This invention provides excellent results without recourse to aromatic or petroleum solvents.

This is a 100% biodegradeable, water-based product designed to break the stain's bond with the underlying substrate, i.e. paint slides off the painted surface.

The modified formulation to be described can be directly applied to many troublesome graffiti marks and left there. The stain quickly disappears. There will be no damage to any surfaces.

The presently preferred basic formulation is as follows:

| | CAS Numbers |
|---|---|
| Glycol ether EB | 111-76-2 |
| Glycol ether EB and DPNP | 111-76-2 |
| Acetone | 67-64-1 |
| DBE - DI Base Ester | 1119-40-0 |
| Acetic acid | 64-19-17 |
| De-ionized water | 7732-18-5 |
| Fragrance/Pine (Chemia) | 29163 |

In all the formulations and guidelines given below, at least one substance from each group must be included.

As a variation of the below formulae, an amount of thixotropic agent equal to 5.2 percent by weight can be added to each of the formulae, substituting for an equal amount of de-ionized water. As an example, cellulose and fumed silica make excellent thickeners for these compositions.

| 15.5% VOC Formulation percentages | |
|---|---|
| a. De-ionized water | 53.7 |
| b. Glycol ether EB | 15.5 |
| c. Acetone | 13.6 |
| d. DBE - DI Base Ester | 16.4 |
| e. Acetic acid | 0.3 |
| f. Fragrance | 0.5 |
| | 100.0 |

| 7.25% VOC Formulation percentages - A | |
|---|---|
| a. De-ionized water | 53.7 |
| b. Glycol ether EB | 7.25 |
| Glycol ether DB | 7.25 |
| c. Acetone | 13.6 |
| d. DBE - DI Base Ester | 16.4 |
| e. Acetic acid | 0.3 |
| f. Fragrance | 0.5 |
| | 100.0 |

| 7.25% VOC Formulation percentages - B | |
|---|---|
| a. De-ionized water | 53.7 |
| b. Glycol ether EB | 7.25 |
| Glycol ether DPNP | 7.25 |
| c. Acetone | 13.6 |
| d. DBE - DI Base Ester | 16.4 |
| e. Acetic acid | 0.3 |
| f. Fragrance | 0.5 |
| | 100.0 |

| Variable Range VOC Formulation percentages | |
|---|---|
| a. De-ionized water | (varying) |
| b. Glycol ether EB | 0-14 |
| Glycol ether DPNP | 1-15.5 |
| c. Acetone | 13.6 |
| d. DBE - DI Base Ester | 16.4 |
| e. Acetic acid | 0.3 |
| f. Fragrance | 0.5 |
| | 100.0 |

This invention is not to be limited to the embodiments described in the description which are given by way of example and not of limitation, but only in accordance with the scope of the appended claims.

I claim:

1. A composition for removing graffiti from surfaces, consisting essentially of:
    a. 53.7 percent deionized water;
    b. 15.5 percent Glycol Ether EB;
    c. 13.6 percent acetone;
    d. 16.4 percent DBE;
    e. 0.3 percent acetic acid; and
    f. 0.5 percent fragrance.

2. A composition for removing graffiti from surfaces, consisting essentially of:
    a. 53.7 percent deionized water;
    b. 7.25 percent Glycol Ether EB and 7.25 percent Glycol Ether DB;
    c. 13.6 percent acetone;
    d. 16.4 percent DBE;
    e. 0.3 percent acetic acid; and
    f. 0.5 percent fragrance.

3. A composition for removing graffiti from surfaces, consisting essentially of:
    a. 53.7 percent deionized water;
    b. 7.25 percent Glycol Ether EB and 7.25 percent Glycol Ether DPNP;
    c. 13.6 percent acetone;
    d. 16.4 percent DBE;
    e. 0.3 percent acetic acid; and
    f. 0.5 percent fragrance.

4. A composition for removing graffiti from surfaces, consisting essentially of:
    a. a varying percentage deionized water;
    b. 0 to 14 percent Glycol Ether EB and 1 to 15.5 percent Glycol Ether DPNP;
    c. 13.6 percent acetone;
    d. 16.4 percent DBE;
    e. 0.3 percent acetic acid; and
    f. 0.5 percent fragrance.

5. A composition for removing graffiti from surfaces, as in claim 1, where the amount of de-ionized water is replaced with 48.5 percent de-ionized water plus 5.2 percent thixotropic agent.

6. A composition for removing graffiti from surfaces, as in claim 2, where the amount of de-ionized water is replaced with 48.5 percent de-ionized water plus 5.2 percent thixotropic agent.

7. A composition for removing graffiti from surfaces, as in claim 3, where the amount of de-ionized water is replaced with 48.5 percent de-ionized water plus 5.2 percent thixotropic agent.

8. A composition for removing graffiti from surfaces, as in claim 4, where the varying percentage of de-ionized water is replaced with a reduced, varying percentage of de-ionized water plus 5.2 percent thixotropic agent.

* * * * *